(12) United States Patent  
Liu et al.

(10) Patent No.: US 9,883,422 B2
(45) Date of Patent: Jan. 30, 2018

(54) METHOD AND APPARATUS FOR ENHANCED CONNECTION CONTROL

(75) Inventors: Yang Liu, Beijing (CN); Haitao Li, Beijing (CN); Dajiang Zhang, Beijing (CN)

(73) Assignee: Nokia Technologies Oy, Espoo (FI)

( * ) Notice: Subject to any disclaimer, the term of this patent is extended or adjusted under 35 U.S.C. 154(b) by 29 days.

(21) Appl. No.: 14/373,481

(22) PCT Filed: Feb. 10, 2012

(86) PCT No.: PCT/CN2012/071025
§ 371 (c)(1),
(2), (4) Date: Jul. 21, 2014

(87) PCT Pub. No.: WO2013/117009
PCT Pub. Date: Aug. 15, 2013

(65) Prior Publication Data
US 2015/0017976 A1  Jan. 15, 2015

(51) Int. Cl.
*H04W 36/00* (2009.01)
*H04W 76/02* (2009.01)
*H04W 36/28* (2009.01)
*H04W 36/30* (2009.01)
*H04W 12/04* (2009.01)

(52) U.S. Cl.
CPC ... *H04W 36/0038* (2013.01); *H04W 36/0033* (2013.01); *H04W 76/028* (2013.01); *H04W 12/04* (2013.01); *H04W 36/28* (2013.01); *H04W 36/30* (2013.01); *H04W 76/025* (2013.01)

(58) Field of Classification Search
CPC ..... H04W 8/183; H04W 48/18; H04W 36/20; H04W 36/18; H04W 36/12; H04W 36/32; H04W 64/00; H04W 36/30

USPC .... 455/432.1–435.2, 436–453, 456.1–456.3; 370/329–334
See application file for complete search history.

(56) References Cited

U.S. PATENT DOCUMENTS

| 7,551,576 B2 | 6/2009 | Ahmavaara |
| 8,019,346 B2 | 9/2011 | Sachs et al. |

(Continued)

FOREIGN PATENT DOCUMENTS

| CN | 1960569 A | 5/2007 |
| CN | 101212798 A | 7/2008 |

(Continued)

OTHER PUBLICATIONS

Extended European Search Report received for corresponding European Patent Application No. 12867794.5, dated Sep. 7, 2015, 9 pages.

(Continued)

*Primary Examiner* — Dai A Phuong
(74) *Attorney, Agent, or Firm* — Mintz Levin Cohn Ferris Glovsky and Popeo, P.C.

(57) ABSTRACT

An enhanced connection control including maintaining a first connection between a first network node and a user equipment which has a second connection with a second network node, determining a third network node for re-establishing a third connection between the third network node and the user equipment, in response to a link failure of the second connection, and transferring context information of the user equipment from the first network node to the third network node.

22 Claims, 6 Drawing Sheets

(56) References Cited

U.S. PATENT DOCUMENTS

| | | | |
|---|---|---|---|
| 8,812,050 B1* | 8/2014 | Bencheikh | H04W 36/32 370/331 |
| 9,736,721 B2 | 8/2017 | Laroia et al. | |
| 2005/0254469 A1 | 11/2005 | Verma et al. | |
| 2006/0098599 A1* | 5/2006 | Choi | H04W 36/0072 370/331 |
| 2006/0291419 A1* | 12/2006 | McConnell | H04L 29/06027 370/331 |
| 2007/0147315 A1 | 6/2007 | Khoury et al. | |
| 2009/0318144 A1* | 12/2009 | Thomas | H04W 48/20 455/434 |
| 2011/0201335 A1* | 8/2011 | Garrett | H04W 36/32 455/436 |
| 2011/0250880 A1 | 10/2011 | Olsson | |
| 2011/0250892 A1 | 10/2011 | Gupta et al. | |
| 2012/0252464 A1* | 10/2012 | Borst | H04W 36/22 455/443 |
| 2012/0258717 A1* | 10/2012 | Handforth | H04W 36/32 455/436 |
| 2012/0309397 A1* | 12/2012 | Rao | H04W 8/00 455/437 |
| 2012/0327908 A1* | 12/2012 | Gupta | H04W 36/0011 370/331 |
| 2013/0039343 A1* | 2/2013 | Hori | H04W 36/12 370/331 |
| 2013/0065600 A1* | 3/2013 | Lim | H04W 36/0066 455/450 |
| 2013/0150105 A1* | 6/2013 | Clevorn | H04W 48/12 455/501 |
| 2013/0286878 A1* | 10/2013 | Tu | H04W 36/0094 370/252 |
| 2014/0370897 A1* | 12/2014 | Vesterinen | H04W 36/08 455/436 |
| 2015/0023287 A1* | 1/2015 | Oga | H04B 1/7113 370/329 |

FOREIGN PATENT DOCUMENTS

| | | |
|---|---|---|
| CN | 101883381 | 11/2010 |
| CN | 101919284 | 12/2010 |
| CN | 101998388 A | 3/2011 |
| CN | 102348191 | 2/2012 |
| EP | 2109278 * | 10/2009 |
| EP | 2205021 * | 7/2010 |
| EP | 2205021 A1 | 7/2010 |
| EP | 2271144 A1 | 1/2011 |
| EP | 2387270 | 11/2011 |
| WO | 2010121440 | 10/2010 |

OTHER PUBLICATIONS

International Search Report received for corresponding Patent Cooperation Treaty Application No. PCT/CN2012/071025, dated Nov. 22, 2012, 12 pages.

Alcatel-Lucent Shanghai Bell, Alcatel-Lucent: "Discussion on Context Fetch for RRC Connection Re-establishment in LTE HetNets (doc.No. R2-11623)", 3GPP TSG-RAN WG2 Meeting #76, R2-116123, [on line], Nov. 8, 2011, San Francisco, USA, Nov. 14-Nov. 18, 2011.

Nokia Corporation, Nokia Siemens Network: "Re-establishment issues in HetNet scenarios (doc No. R2-115732),", 3GPP TSG-RAN WG2 Meeting #75bis, R2-115732, [online] Nov. 4, 2011, zhuhai China Oct. 10-14, 2011.

"3rd Generation Partnership Project; Technical Specification Group Radio Access Network; Evolved Universal Terrestrial Radio Access (E-UTRA); Radio Resource Control (RRC); Protocol specification (Release 10)", 3GPP TS 36.331, V10.3.0, Sep. 2011, pp. 1-296.

"3rd Generation Partnership Project; Technical Specification Group Radio Access Network; Evolved Universal Terrestrial Radio Access (E-UTRA); User Equipment (UE) procedures in idle mode(Release 10)", 3GPP TS 36.304, V10.3.0, Sep. 2011, pp. 1-33.

"3rd Generation Partnership Project; Technical Specification Group Radio Access Network; Evolved Universal Terrestrial Radio Access (E-UTRA); Requirements for support of radio resource management (Release 10)", 3GPP TS 36.133, V10.4.0, Sep. 2011, pp. 1-462.

"3rd Generation Partnership Project; Technical Specification Group Services and System Aspects; 3GPP System Architecture Evolution (SAE); Security architecture (Release 11)", 3GPP TS 33.401, V11. 1.0, Sep. 2011, pp. 1-123.

"Long Term Evolution Protocol Overview", White Paper, Freescale Semiconductor, Rev 0, Oct. 2008, 21 pages.

"LTE Frequently Asked Questions", LTE World, Retrieved on Sep. 26, 2014, Webpage available at : http://lteworld.org/faq.

"eNode B Wraparound Testing a Comprehensive Guide", IXIA, Rev B, Aug. 2009, pp. 1-22.

International Search Report and Written Opinion received for corresponding Patent Cooperation Treaty Application No. PCT/CN2012/070896, dated Nov. 15, 2012, 12 pages.

\* cited by examiner

US 9,883,422 B2

METHOD AND APPARATUS FOR ENHANCED CONNECTION CONTROL

RELATED APPLICATION

This application was originally filed as PCT Application No. PCT/CN2012/071025 filed Feb. 10, 2012.

FIELD OF THE INVENTION

The present invention generally relates to communication networks. More specifically, the invention relates to a method and apparatus for enhanced connection control.

BACKGROUND

The modern communications era has brought about a tremendous expansion of communication networks. Wireless and mobile networking technologies have addressed related consumer demands, while providing more flexibility and immediacy of information transfer. In a communication system such as Long Term Evolution (LTE) network, a Radio Link Failure (RLF) or handover failure is the typical common reason to trigger a Radio Resource Control (RRC) connection re-establishment procedure. During this re-establishment procedure, if a user equipment (UE) re-establishes to a cell which does not have the context of the UE, which may happen more frequently in heterogeneous networks, the re-establishment procedure would suffer a failure, then the UE will return back to an idle mode and traffics may be interrupted. This may decrease system performances and lead to a very bad user experience. Thus it is desirable to improve this re-establishment robustness issue.

SUMMARY

The present description introduces a solution for enhanced connection control, which can increase the success rate of RRC connection re-establishment, especially caused by a RLF or handover failure in a communication system, and bring good user experiences when enjoying services.

According to a first aspect of the present invention, there is provided a method comprising: maintaining a first connection between a first network node and a UE which has a second connection with a second network node; determining a third network node for re-establishing a third connection between the third network node and the UE, in response to a link failure of the second connection; and transferring context information of the UE from the first network node to the third network node.

According to a second aspect of the present invention, there is provided an apparatus comprising: at least one processor; and at least one memory including computer program code, the at least one memory and the computer program code configured to, with the at least one processor, cause the apparatus to perform at least the following: maintaining a first connection between the apparatus and a UE which has a second connection with another apparatus; determining a target apparatus for re-establishing a third connection between the target apparatus and the UE, in response to a link failure of the second connection; and transferring context information of the UE from the apparatus to the target apparatus.

According to a third aspect of the present invention, there is provided a computer program product comprising a computer-readable medium bearing computer program code embodied therein for use with a computer, the computer program code comprising: code for maintaining a first connection between a first network node and a UE which has a second connection with a second network node; code for determining a third network node for re-establishing a third connection between the third network node and the UE, in response to a link failure of the second connection; and code for transferring context information of the UE from the first network node to the third network node.

According to a fourth aspect of the present invention, there is provided an apparatus comprising: maintaining means for maintaining a first connection between the apparatus and a UE which has a second connection with another apparatus; determining means for determining a target apparatus for re-establishing a third connection between the target apparatus and the UE, in response to a link failure of the second connection; and transferring means for transferring context information of the UE from the apparatus to the target apparatus.

According to exemplary embodiments, the apparatus in the second/fourth aspect of the present invention may comprise a first network node, the another apparatus in the second/fourth aspect of the present invention may comprise a second network node, and the target apparatus in the second/fourth aspect of the present invention may comprise a third network node. For example, the first network node may be located in a first mobile communications network, while the second network node and the third network node may be located in a second mobile communications network. In an exemplary embodiment, said determining the third network node for re-establishing the third connection may comprise: receiving an indication of the third network node from the UE. In another exemplary embodiment, said determining the third network node for re-establishing the third connection may comprise: receiving a notification of the link failure from the UE; selecting the third network node based at least in part on a measurement report from the UE; and sending an indication of the third network node to the UE. As an example, the context information of the UE may comprise at least one of a security key for the third connection and security information related to the UE. According to an exemplary embodiment, the third network node may initiate a key refresh procedure to update a local key for the UE.

According to a fifth aspect of the present invention, there is provided a method comprising: maintaining a first connection between a first network node and a UE, and a second connection between a second network node and the UE; detecting a link failure of the second connection; sending a message to the first network node to instruct the first network node to transfer context information of the UE to a third network node; and performing a re-establishment procedure for a third connection with the third network node having the context information of the UE transferred from the first network node.

According to a sixth aspect of the present invention, there is provided an apparatus comprising: at least one processor; and at least one memory including computer program code, the at least one memory and the computer program code configured to, with the at least one processor, cause the apparatus to perform at least the following: maintaining a first connection between a first network node and the apparatus, and a second connection between a second network node and the apparatus; detecting a link failure of the second connection; sending a message to the first network node to instruct the first network node to transfer context information of the apparatus to a third network node; and performing a re-establishment procedure for a third connection with the third network node having the context information of the apparatus transferred from the first network node.

According to a seventh aspect of the present invention, there is provided a computer program product comprising a computer-readable medium bearing computer program code embodied therein for use with a computer, the computer program code comprising: code for maintaining a first connection between a first network node and a UE, and a second connection between a second network node and the UE; code for detecting a link failure of the second connection; code for sending a message to the first network node to instruct the first network node to transfer context information of the UE to a third network node; and code for performing a re-establishment procedure for a third connection with the third network node having the context information of the UE transferred from the first network node.

According to an eighth aspect of the present invention, there is provided an apparatus comprising: maintaining means for maintaining a first connection between a first network node and the apparatus, and a second connection between a second network node and the apparatus; detecting means for detecting a link failure of the second connection; sending means for sending a message to the first network node to instruct the first network node to transfer context information of the apparatus to a third network node; and performing means for performing a re-establishment procedure for a third connection with the third network node having the context information of the apparatus transferred from the first network node.

In accordance with an exemplary embodiment, the message may comprise an indication of the third network node. In accordance with another exemplary embodiment, the message may comprise a notification of the link failure, and in this case, the UE may receive an indication of the third network node from the first network node, wherein the third network node is selected based at least in part on a measurement report provided by the UE.

According to a ninth aspect of the present invention, there is provided a method comprising: receiving context information of a UE from a first network node having a first connection with the UE, in response to a link failure of a second connection between a second network node and the UE; and performing a re-establishment procedure for a third connection between a third network node and the UE, based at least in part on the context information of the UE.

According to a tenth aspect of the present invention, there is provided an apparatus comprising: at least one processor; and at least one memory including computer program code, the at least one memory and the computer program code configured to, with the at least one processor, cause the apparatus to perform at least the following: receiving context information of a UE from a first network node having a first connection with the UE, in response to a link failure of a second connection between a second network node and the UE; and performing a re-establishment procedure for a third connection between the apparatus and the UE, based at least in part on the context information of the UE.

According to a eleventh aspect of the present invention, there is provided a computer program product comprising a computer-readable medium bearing computer program code embodied therein for use with a computer, the computer program code comprising: code for receiving context information of a UE from a first network node having a first connection with the UE, in response to a link failure of a second connection between a second network node and the UE; and code for performing a re-establishment procedure for a third connection between a third network node and the UE, based at least in part on the context information of the UE.

According to a twelfth aspect of the present invention, there is provided an apparatus comprising: receiving means for receiving context information of a UE from a first network node having a first connection with the UE, in response to a link failure of a second connection between a second network node and the UE; and performing means for performing a re-establishment procedure for a third connection between the apparatus and the UE, based at least in part on the context information of the UE.

According to exemplary embodiments, the apparatus in the tenth/twelfth aspect of the present invention may comprise a third network node. In accordance with exemplary embodiments, the context information of the UE may comprise at least one of a security key for the third connection and security information related to the UE. According to an exemplary embodiment, the third network node may coordinate with the first network node and the second network node to switch a user plane traffic transmission point to the third network node.

In exemplary embodiments of the present invention, the provided methods, apparatus, and computer program products can enable a UE to select a cell or a network node which has this UE's context during a RRC connection re-establishment procedure caused by a RLF or handover failure. Therefore, the success rate of re-establishment can be improved and good user experiences may be maintained.

BRIEF DESCRIPTION OF THE DRAWINGS

The invention itself, the preferable mode of use and further objectives are best understood by reference to the following detailed description of the embodiments when read in conjunction with the accompanying drawings, in which.

DETAILED DESCRIPTION OF THE INVENTION

Figure 1:
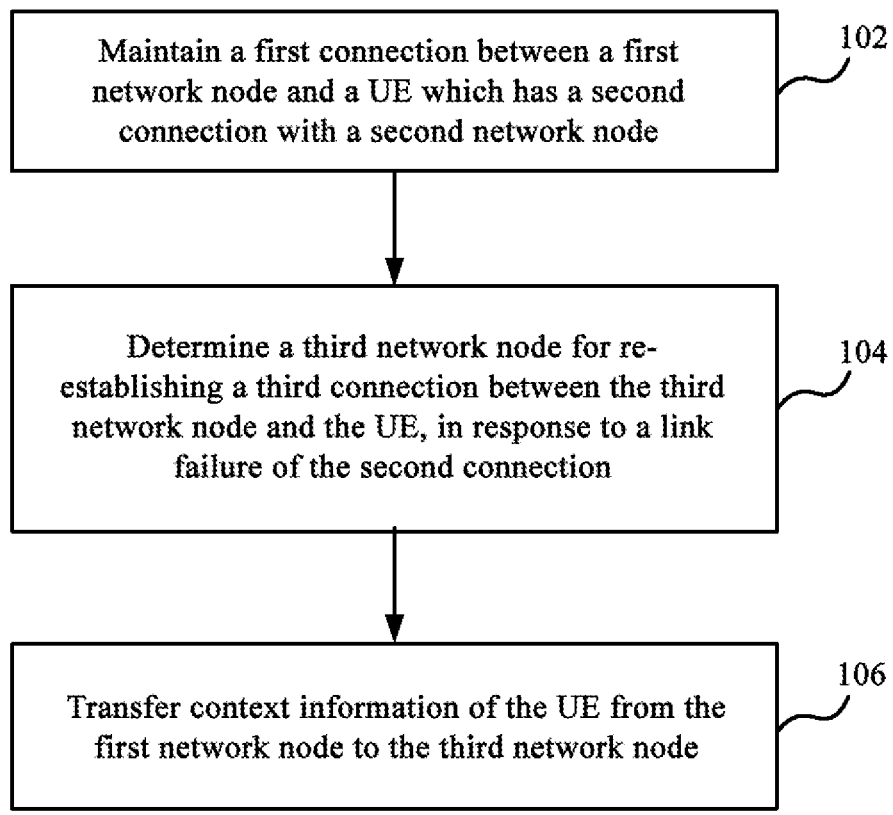
FIG. 1 is a flowchart illustrating a method for enhanced connection control, which may be performed at a first network node in accordance with embodiments of the present invention.

The embodiments of the present invention are described in detail with reference to the accompanying drawings. Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

Along with the development of radio communication networks such as LTE system, high-speed data services have been treated as one of the most important requirements. Especially for a Local Area Network (LAN), higher data rate is expected from a user's perspective. How to provide local services with high speed data rate has become a hot topic in 3GPP (3rd Generation Partnership Project).

A new architecture called as Local Area Evolution (LAE) is designed aiming to deploy a local area system providing high performance on peak data rate, cell capacity, Quality of Service (QoS) guarantee, interference management, etc. Besides, low cost and high energy efficiency are also expected for a LAE system. In the LAE system, Support Node (SN) concept is introduced and it is a network element located in the core network, providing some support/control/maintenance functionalities to the LAE system. A Base Station (BS) is located in the Radio Access Network (RAN) side which provides a local area network, just like Home evolved Node B (HeNB) in LTE system. A UE may maintain two connections, one with a macro eNB and another with a LAE BS, which is called as "dual radio connections". The macro network connection is more stable and more carefully managed so that the UE could not easily lose its connection, while the LAE connection is there more for providing high speed data services and some characteristic services in a local area. Another architecture called as LTE-LAN is also researched to compete with world-wide popular Wireless Fidelity (WiFi) technique. LTE-LAN is basically assumed to be based on LTE technology but is more focused on some local area use cases and scenarios, and it has much similarity with the LAE concept. LTE-LAN is also expected to provide high performance local services for users with low cost. A BS in LAE architecture may be considered as an Access Point (AP) in LTE-LAN system. LTE-LAN and LTE macro network are independent networks which may operate in different bands. So far, an X2-like or S1-like interface may be introduced between different APs and between an AP and an eNB, since a lot of features (for example carrier aggregation, interference management, etc.) would be developed with this interface.

For example, in a LTE system, the RLF or handover failure is the typical common reason to trigger a RRC connection re-establishment procedure. In a heterogeneous network, the RLF and handover failure would happen more frequently since a UE has a higher risk of encountering some strong interference from various types of small cells such as Pico, Relay, Femto. According to current specifications (such as TS 36.331), a UE may try to re-establish its connection with a network after a radio link failure happened. Generally, a re-establishment procedure may involve the following two sub-procedures: (i) performing a cell selection procedure to select a cell for example according to TS 36.304; and (ii) sending a RRC connection re-establishment request message to the selected cell and waiting for the response, and if the network feeds back an acknowledgement (ACK), the re-establishment is successful. During this re-establishment procedure, if the UE re-establishes to a cell which does not have the context of the UE, which may happen more frequently in heterogeneous networks, the re-establishment would suffer a failure. In this case, the UE will return back to an idle mode and traffics will be interrupted. This may deteriorate system performances and lead to very bad user experiences. Thus it is needed to improve this re-establishment robustness issue.

In a communications network such as LTE-LAN and LAE system, as described above, a UE may maintain two connections, one for a macro network and another for a local area network, which may be called as "dual radio connections". For example, the UE may have two independent RRC connections, one with a first network node (such as a LTE-LAN AP) and the other with a second network node (such as a LTE Macro eNB). Similar to the LTE system, a RLF may also occur during a communication procedure, or a handover failure may occur during a handover procedure. According to exemplary embodiments of the present invention, when the RLF or handover failure occurs in one of these two network nodes (for example, at the second network node), there are two schemes to guarantee a re-establishment procedure for the UE. In scheme I, the UE may reports this RLF issue to the first network node and the first network node can select a cell (corresponding to a third network node) according to this UE's measurement report and send an identifier (ID) for the cell/third network node to the UE for re-establishment. In addition, the first network node can derive security keys and transfer context information of this UE to the selected cell. In scheme II, upon the RLF or handover failure, the UE can select a cell (corresponding to the third network node) for re-establishment, and then indicate the selected target network node which is used for the RRC connection re-establishment to the first network node. On receiving this indication, the first network node can derive security keys and transfer context information of the UE to the selected target network node. In both of the above schemes, the UE can succeed in the coming re-establishment procedure, because the solutions provided by the present invention can ensure that the target cell (corresponding to the third network node) has the context information of the UE. More details of the solutions proposed in the present invention will be illustrated hereinafter by way of example with reference to the accompanying drawings.

FIG. 1 is a flowchart illustrating a method for enhanced connection control, which may be performed at a first network node (such as a BS/eNB/AP/control center, etc.) in accordance with embodiments of the present invention. The solution according to exemplary embodiments may be applicable to a communications network such as LTE-LAN and LAE where a UE (such as a mobile station, a wireless terminal, a personal digital assistant (PDA), a portable device and the like) may establish respective radio connections with two network nodes. In block 102, the first network node may maintain a first connection with a UE which has a second connection with a second network node (such as a BS/eNB/AP/control center and so on). For example, the first network node may be located in a first mobile communications network (such as a local area network), while the second network node and the third network node may be located in a second mobile communications network (such as a macro network). In response to a link failure of the second connection, as shown in block 104, the first network node may determine a third network node for re-establishing a third connection between the third network node and the UE. In an exemplary embodiment, determining the third network node for re-establishing the third connection may comprise receiving an indication of the third network node from the UE, for example an identifier of a cell corresponding to the third network node. Alternatively, determining the third network node for re-establishing the third connection may comprise: receiving a notification of the link failure from the UE, selecting the third network node based at least in part on a measurement report from the UE, and sending an indication of the third network node to the UE. With the indication of the third network node, in block 106, the first network node can transfer context information of the UE to the third network node. According to exemplary embodiments, the context information of the UE may comprise at least one of: a security key for the third connection, and security information related to the UE. For example, the security key for the third connection may comprise a new security key (such as $K_{eNB}^*$) calculated based at least in part on a security key (such as $K_{eNB}$) for the first network node, Physical Cell Identity (PCI) and Down Link (DL) frequency of the third network node according to TS 33.401. In an exemplary embodiment, the security information related to the UE may comprise at least one of a token and a security capability of the UE. The context information of the UE can be transferred from the first network node to the third network node through an interface (such as an X2-like or S1-like interface) between them. This context transfer procedure aims to provide enough contexts for the re-establishment procedure for the related UE. After transferring the context information of the UE, the first network node may initiate a key refresh procedure to update a local key for the UE.

Figure 2:
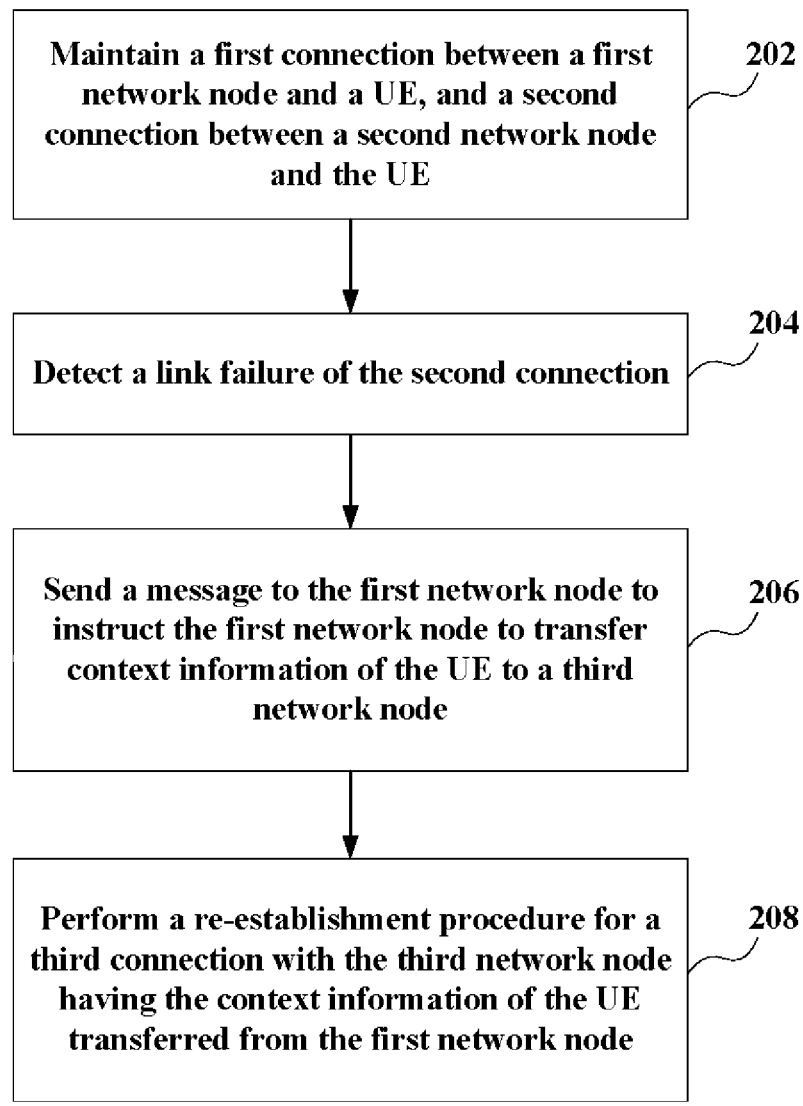
FIG. 2 is a flowchart illustrating a method for enhanced connection control, which may be performed at a UE in accordance with embodiments of the present invention.

FIG. 2 is a flowchart illustrating a method for enhanced connection control, which may be performed at a UE in accordance with embodiments of the present invention. Corresponding to the description with respect to FIG. 1, the UE (such as a mobile station, a wireless terminal, a PDA, a portable device and the like) may maintain a first connection with a first network node, and a second connection with a second network node, as shown in block 202. For example, the first connection may be with the UE's serving AP and the second connection may be with the UE's serving eNB, and vice versa. In block 204, the UE may detect a link failure of the second connection, and then it may send a message to the first network node to instruct the first network node to transfer context information of the UE to a third network node, as shown in block 206. According to an exemplary embodiment, the message may comprise an indication of the third network node. In this case, the third network node may be selected by the UE itself (for example, choosing a cell corresponding to the third network node in a cell selection procedure). As an example, the UE may indicate the selected cell to the first network node using uplink RRC messages such as measurement report, ULInformationTransfer, or a new RRC message). Alternatively, the message may comprise a notification of the link failure. In this case, the UE may receive an indication of the third network node from the first network node, where the third network node (corresponding to a target cell) can be selected by the first network node based at least in part on a measurement report provided by the UE. With the indication of the third network node, the UE can read system information of this selected network node/cell for the following re-establishment procedure. In block 208, the UE can perform a re-establishment procedure for a third connection with the third network node having the context information of the UE transferred from the first network node. As described above with respect to FIG. 1, the context information of the UE may comprise at least one of a security key for the third connection and security information related to the UE. Since the context transfer procedure can ensure that the target cell/the third network node has the context of the UE, the re-establishment procedure can succeed definitely.

Figure 3:
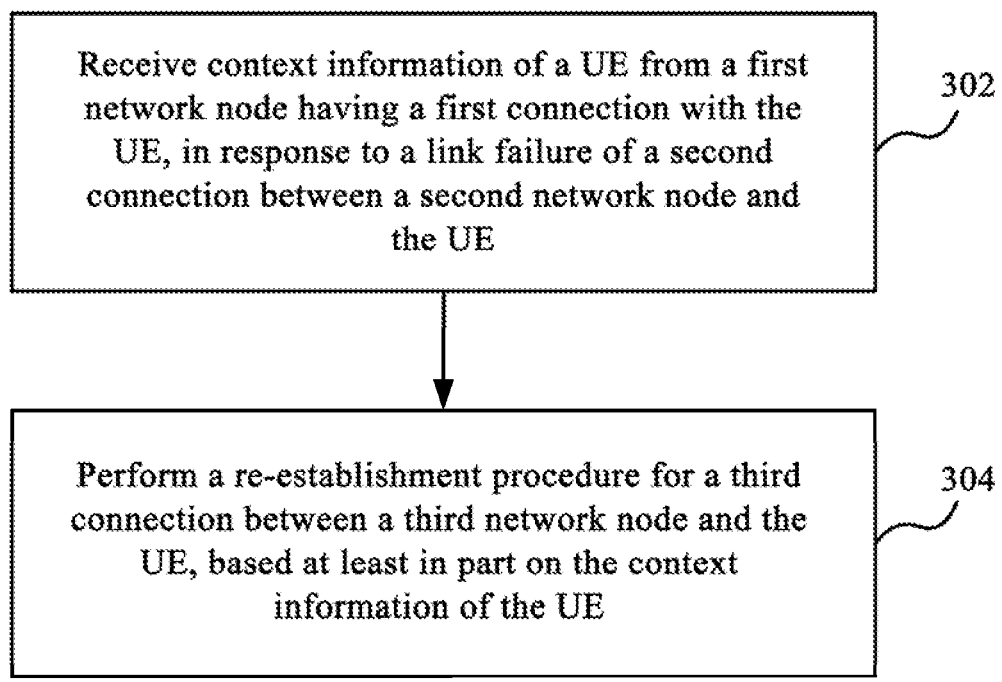
FIG. 3 is a flowchart illustrating a method for enhanced connection control, which may be performed at a third network node in accordance with embodiments of the present invention.

FIG. 3 is a flowchart illustrating a method for enhanced connection control, which may be performed at a third network node (such as a BS/eNB/AP/control center, etc.) in accordance with embodiments of the present invention. According to exemplary embodiments, a UE can maintain two independent connections for different services, for example, a first connection with a first network node such as LTE-LAN AP, and a second connection with a second network node such as LTE Macro eNB. Actually, the first network node and the second network node may be the same kind of network nodes or different types of network nodes. For example, one of these two connections may be used for local network services (such as high speed data services in a local area), and the other may be used for macro network services (such as more stable and more carefully managed services in a macro network). When a RLF or handover failure is detected for one of the connections, the UE may initiate a RRC connection re-establishment procedure, for example towards a third network node. Corresponding to the description with respect to FIG. 1, as a target network node, the third network node may receive context information of the UE from the first network node having the first connection with the UE, in response to a link failure of the second connection between the second network node and the UE, as shown in block 302. Based at least in part on the context information of the UE, in block 304, a re-establishment procedure can be performed for a third connection between the third network node and the UE. After the successful re-establishment procedure, the third network node may coordinate with the first network node and the second network node to switch a user plane traffic transmission point to the third network node. Thus, the new user plane transmission path may be from the first network node to the third network node, then to the core network.

The various blocks shown in FIGS. 1-3 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown. The solution provided by the present invention can address the control plane issues of a UE in a communications network such as LTE-LAN system, especially the re-establishment robustness issues, to provide more efficient connection control for the UE. For example, it can increase the success rate of a RRC connection re-establishment, especially caused by a RLF or handover failure in a LTE-LAN system. It will be realized that the solution described here is designed for quick recover from a RLF or handover failure when there is a second radio connection, and a LTE-LAN system is described merely as an example, but not restricted under this scenario.

Figure 4A:
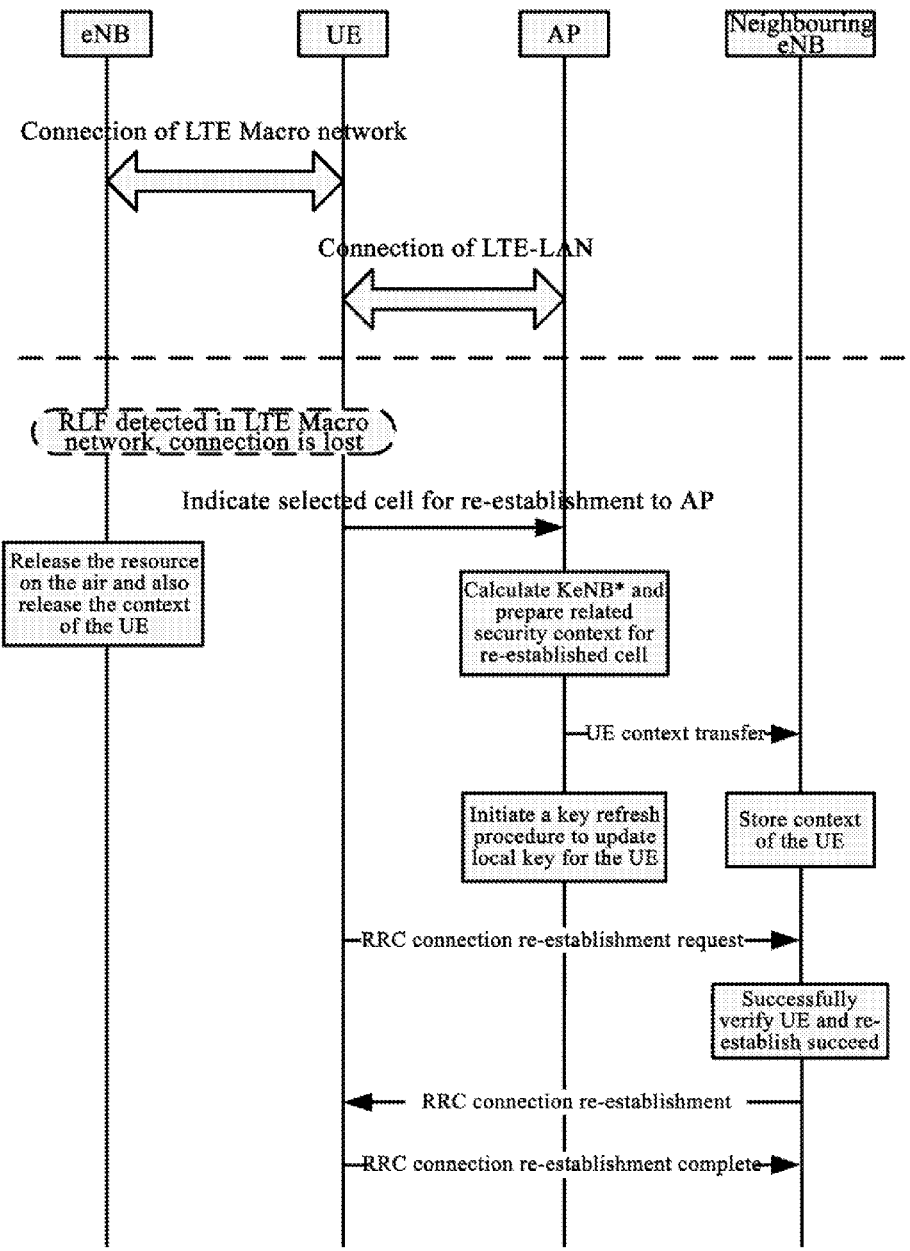
FIG. 4A shows exemplary re-establishment enhancements with a UE selection mechanism in accordance with an embodiment of the present invention.
Figure 4B:
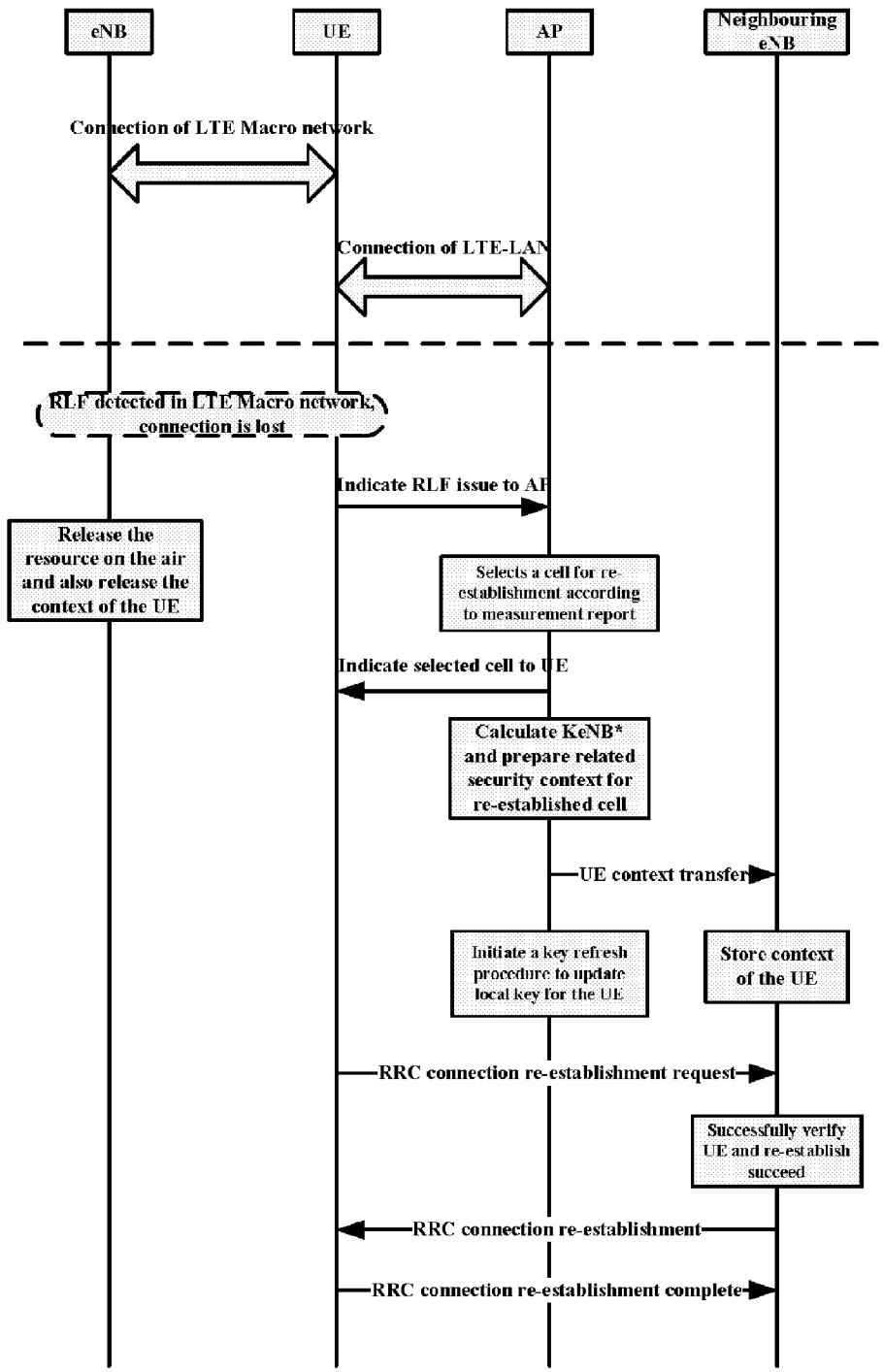
FIG. 4B shows exemplary re-establishment enhancements with a network side selection mechanism in accordance with another embodiment of the present invention.

FIG. 4A shows exemplary re-establishment enhancements with a UE selection mechanism in accordance with an embodiment of the present invention, and FIG. 4B shows exemplary re-establishment enhancements with a network side selection mechanism in accordance with another embodiment of the present invention. In the scenarios illustrated in FIGS. 4A-4B, a UE may maintain two connections with a communications system, one with a macro network node such as a LTE Macro eNB (shown as eNB in FIGS. 4A-4B) and the other with a local network node such as a LTE-LAN AP (shown as AP in FIGS. 4A-4B). When a RLF or handover failure is detected, for example in a LTE Macro network, the UE may initiate a RRC connection re-establishment procedure according to current specifications as shown in FIGS. 4A-4B. It is noted that the eNB where the RLF or handover failure occurred would release the RRC connection immediately and also release contexts for the concerning UE after a fixed time period. In an exemplary embodiment shown in FIG. 4A, the UE can select a cell or a target network node for re-establishment and indicate it to the serving AP. For example, the UE can choose a cell in a cell selection procedure. In this case, this cell has no context of the UE and is not prepared for the UE. The UE may indicate the cell and/or the corresponding target network node selected for the re-establishment to the serving AP using uplink RRC messages (for example measurement report, ULInformationTransfer, or a new RRC message). Then the UE begins to read system information of this selected cell for the following re-establishment procedure. Alternatively, in an exemplary embodiment shown in FIG. 4B, the serving AP can select a cell for re-establishment and indicate it to the UE. Specifically, in this case, when the RLF or handover failure occurred, the UE indicates this issue to the serving AP, and this AP can select a cell for re-establishment for the UE according to this UE's measurement report. Then the serving AP may send an indication of this selected cell and/or the corresponding target network node to the UE for re-establishment.

With the indication of the selected cell/target network node (such as a cell ID or an identifier of the target network node, which may be reported to the AP by the UE as shown in FIG. 4A, or generated locally at the AP as shown in FIG. 4B), the AP in LTE-LAN may send context information of the UE to the new serving eNB (shown as neighboring eNB in FIGS. 4A-4B), and this new serving eNB may store the context information of the UE for the following re-establishment procedure. In an exemplary embodiment, in order to prepare the context information which may be sent to the neighboring eNB, for example, the AP can use its current $K_{eNB}$ and PCI of the target cell, DL frequency of the target cell to generate $K_{eNB}$*, and other related security context (such as a token and a security capability of the UE) may be also contained in the context transfer procedure. After the context transfer procedure, the serving AP may initiate a key refresh procedure for backward security, which is a simple update locally. Since the context transfer procedure can provide enough contexts for the re-establishment procedure for the related UE, it can be ensured that the target cell/neighboring eNB has the required context of the UE. Therefore, when the UE initiates a RRC connection re-establishment procedure towards the selected cell, the re-establishment procedure can succeed definitely. After the successful re-establishment procedure, the new eNB can coordinate with the source eNB and also the LTE-LAN AP to switch a user plane traffic transmission point to the new eNB, which means that the new user plane transmission path may be from the AP to the new eNB, then to the core network.

For example, in the case illustrated in FIG. 4A, the time ($T_{UE\text{-}re\text{-}establish\_delay}$) the UE spends on re-establishment after indicating the selected eNB to the AP can be calculated as below:

$$T_{UE\text{-}re\text{-}establish\_delay} = T_{SI} + T_{PRACH}$$

where the minimum of $T_{PRACH}$ is 10 ms, and a typical value of $T_{SI}$ recommended in TS 36.133 is 1280 ms, so the minimum time it costs for the UE to access to the target cell is about 1290 ms. The context transfer procedure for the UE through an X2-like interface between the AP and the selected eNB would cost typically about 20 ms for example. Therefore, when the UE finished system information reading (which may cost time of $T_{SI}$) and sends a RRC connection re-establishment request message to the selected eNB (which may cost time of $T_{PRACH}$), the selected eNB would have already received the UE's context through network solutions. The solution illustrated with respect to FIG. 4B may introduce a little bit more delay for the re-establishment procedure than the solution illustrated in conjunction with FIG. 4A, but since the delay in air interface is at microsecond level, comparing with the $T_{UE\text{-}re\text{-}establish\_delay}$ which is 1290 ms for the UE, this slight additional delay can be omitted which nearly would not cause any impact at all.

It will be realized that the above solution also can be applied to a scenario where a RLF or handover failure occurs in a local area network. In this case, a macro network node (such as an eNB) serving a UE can transfer context information of the UE to a target network node (such as a neighboring AP) for re-establishment to enable it has enough contexts of the UE for a successful re-establishment procedure. Many advantages may be achieved by using the above described solutions with respect to FIGS. 1-4B. For example, with the approach proposed by the present invention, a UE can be ensured to select a network node/cell which has this UE's context during a RRC connection re-establishment procedure caused by a RLF or handover failure. Therefore, the success rate of re-establishment can be improved and good user experiences can be maintained.

Figure 5:
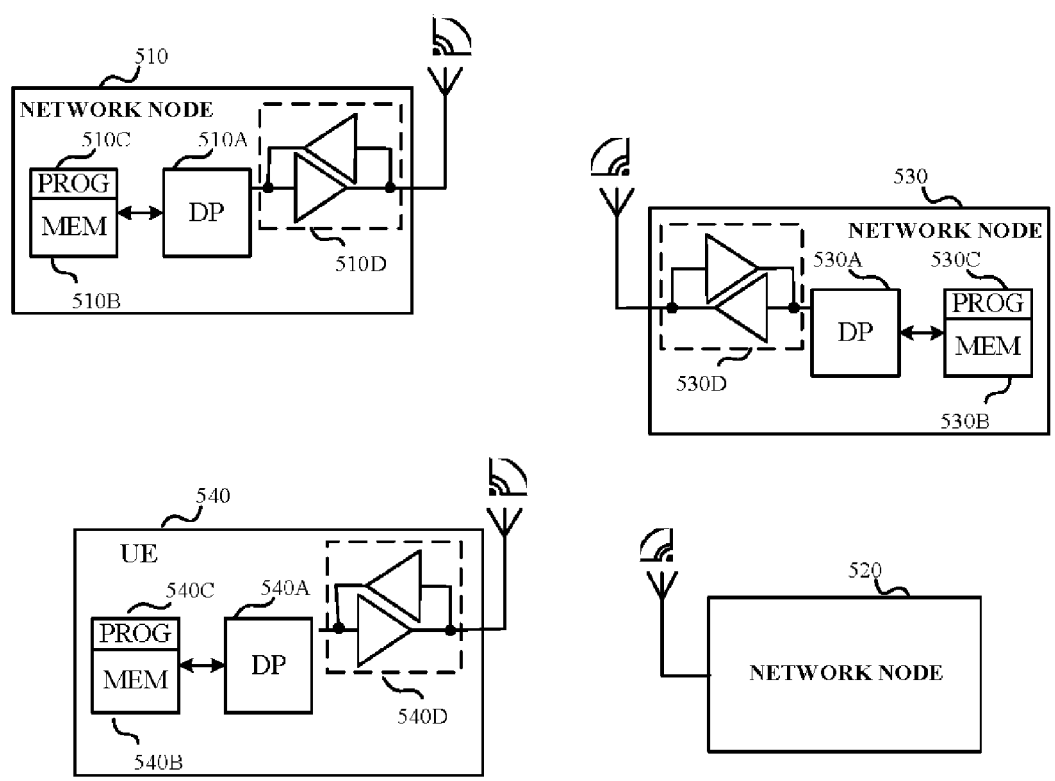
FIG. 5 is a simplified block diagram of various apparatuses which are suitable for use in practicing exemplary embodiments of the present invention.

FIG. 5 is a simplified block diagram of various apparatuses which are suitable for use in practicing exemplary embodiments of the present invention. In FIG. 5, a UE 540 (such as mobile phone, wireless terminal, portable device, PDA, multimedia tablet, and etc.) may be adapted for communicating with one or more network nodes such as a first network node 510, a second network node 520 and a third network node 530. The first network node 510 (such as a BS/eNB/AP/control center, etc.), the second network node 520 (such as a BS/eNB/AP/control center, etc.) and the third network node 530 (such as a BS/eNB/AP/control center, etc.) may be adapted for communicating with each other directly or through a network entity such as a Mobility Management Entity (MME) or other intermediate entity in a core network (not shown in FIG. 5). In an exemplary embodiment, the UE 540 may comprise a data processor (DP) 540A, a memory (MEM) 540B that stores a program (PROG) 540C, and a suitable transceiver 540D for communicating with an apparatus such as another UE, a network node, a server and so on. The first network node 510 may comprise a data processor (DP) 510A, a memory (MEM) 510B that stores a program (PROG) 510C, and a suitable transceiver 510D for communicating with an apparatus such as the second network node 520, the third network node 530, a UE 540 or a network entity (not shown in FIG. 5).

Similarly, the third network node 530 may comprise a data processor (DP) 530A, a memory (MEM) 530B that stores a program (PROG) 530C, and a suitable transceiver 530D for communicating with an apparatus such as the first network node 510, the second network node 520, the UE 540 or a network entity (not shown in FIG. 5). It is noted that the second network node 520 may have components or means similar to the first and the third network nodes although not shown in FIG. 5. For example, at least one of the transceivers 510D, 530D, 540D may be an integrated component for transmitting and/or receiving signals and messages. Alternatively, at least one of the transceivers 510D, 530D, 540D may comprise separate components to support transmitting and receiving signals/messages, respectively. The respective DPs 510A, 530A and 540A may be used for processing these signals and messages.

Alternatively or additionally, the UE 540, the first network node 510 and the third network node 530 may comprise various means and/or components for implementing functions of the foregoing steps and methods in FIGS. 1-3. For example, the UE 540 may comprise: maintaining means for maintaining a first connection between a first network node (such as the first network node 510) and the UE, and a second connection between a second network node (such as the second network node 520) and the UE; detecting means for detecting a link failure of the second connection; sending means for sending a message to the first network node to instruct the first network node to transfer context information of the UE to a third network node (such as the third network node 530); and performing means for performing a re-establishment procedure for a third connection with the third network node having the context information of the UE transferred from the first network node. In an exemplary embodiment, the first network node 510 may comprise: maintaining means for maintaining a first connection between the first network node and a UE (such as the UE 540) which has a second connection with a second network node (such as the second network node 520); determining means for determining a third network node (such as the third network node 530) for re-establishing a third connection between the third network node and the UE, in response to a link failure of the second connection; and transferring means for transferring context information of the UE from the first network node to the third network node. Optionally, the first network node 510 may further comprise initiating means for initiating a key refresh procedure to update a local key for the UE. In another exemplary embodiment, the third network node 530 may comprise: receiving means for receiving context information of a UE (such as the UE 540) from a first network node (such as the first network node 510) having a first connection with the UE, in response to a link failure of a second connection between a second network node (such as the second network node 520) and the UE; and performing means for performing a re-establishment procedure for a third connection between the third network node and the UE, based at least in part on the context information of the UE. Optionally, the third network node 530 may further comprise switching means for switching a user plane traffic transmission point to the third network node by coordinating with the first network node and the second network node.

At least one of the PROGs 510C, 530C, 540C is assumed to comprise program instructions that, when executed by the associated DP, enable an apparatus to operate in accordance with the exemplary embodiments, as discussed above. That is, the exemplary embodiments of the present invention may be implemented at least in part by computer software executable by the DP 510A of the first network node 510, by the DP 530A of the third network node 530 and by the DP 540A of the UE 540, or by hardware, or by a combination of software and hardware.

The MEMs 510B, 530B and 540B may be of any type suitable to the local technical environment and may be implemented using any suitable data storage technology, such as semiconductor based memory devices, flash memory, magnetic memory devices and systems, optical memory devices and systems, fixed memory and removable memory. The DPs 510A, 530A and 540A may be of any type suitable to the local technical environment, and may comprise one or more of general purpose computers, special purpose computers, microprocessors, digital signal processors (DSPs) and processors based on multi-core processor architectures, as non-limiting examples.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It will be appreciated that at least some aspects of the exemplary embodiments of the inventions may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), and etc. As will be realized by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

Although specific embodiments of the invention have been disclosed, those having ordinary skill in the art will understand that changes can be made to the specific embodiments without departing from the spirit and scope of the invention. The scope of the invention is not to be restricted therefore to the specific embodiments, and it is intended that the appended claims cover any and all such applications, modifications, and embodiments within the scope of the present invention.

What is claimed is:

1. A method, comprising:
   maintaining, by a user equipment, network connections comprising a first connection between a first network node and the user equipment and a second connection between a second network node and the user equipment, the first network node having a first network node type and the second network node having a second network node type different from the first network node type;

determining, by the user equipment, a third network node for establishing a third connection between the third network node and the user equipment, in response to a link failure of the second connection, the third network node having the second network node type;

sending, by the user equipment and in response to the link failure, an instruction to transfer context information of the user equipment from the first network node to the third network node, while maintaining the first connection between the first network node and the user equipment; and establishing, by the user equipment and in response to the link failure, the third connection between the third network node and the user equipment, the third connection established based on the transferred context information.

2. The method according to claim 1, wherein the determining of the third network node for establishing the third connection comprises:

receiving an indication of the third network node from the user equipment.

3. The method according to claim 1, wherein the determining of the third network node for establishing the third connection comprises:

receiving a notification of the link failure from the user equipment;

selecting the third network node based at least in part on a measurement report from the user equipment; and sending an indication of the third network node to the user equipment.

4. The method according to claim 1, wherein the context information of the user equipment comprises at least one of: a security key for the third connection and security information related to the user equipment.

5. The method according to claim 1, further comprising: initiating a key refresh procedure to update a local key for the user equipment.

6. The method according to claim 1, wherein the first network node is in a first mobile communications network, and the second network node and the third network node are in a second mobile communications network.

7. The method according to claim 1, wherein the first connection between the first network node and the user equipment provides a first service and the second connection with the second network node and the third connection with the third network node provide a second service.

8. The method of claim 1, wherein the first network node type is a local area network node and the second network node type is a cellular network node.

9. An apparatus, comprising:
at least one processor; and
at least one memory including computer program code, the at least one memory and the computer program code configured to, with the at least one processor, cause the apparatus to at least:
maintain a first connection between the apparatus and a user equipment which has a second connection with another apparatus, the apparatus having a first apparatus type and the another apparatus having a second apparatus type different from the first apparatus type;
determine a target apparatus for establishing a third connection between the target apparatus and the user equipment, in response to a link failure of the second connection, the target apparatus having the second apparatus type; and
transfer, to the target apparatus and in response to the link failure, context information of the user equipment to establish the third connection between the target apparatus having the second apparatus type and the user equipment, while maintaining the first connection between the apparatus and the user equipment.

10. The apparatus according to claim 9, wherein the apparatus is further configured to at least:
receive an indication of the target apparatus from the user equipment.

11. The apparatus according to claim 9, wherein the apparatus is further configured to at least:
receive a notification of the link failure from the user equipment;
select the target apparatus based at least in part on a measurement report from the user equipment; and
send an indication of the target apparatus to the user equipment.

12. The apparatus according to claim 9, wherein the context information of the user equipment comprises at least one of: a security key for the third connection and security information related to the user equipment.

13. The apparatus according to claim 9, wherein the apparatus is further caused to at least initiate a key refresh procedure to update a local key for the user equipment.

14. The apparatus according to claim 9, wherein the apparatus is in a first mobile communications network, and the another apparatus and the target apparatus are in a second mobile communications network.

15. A method, comprising:
maintaining, by a user equipment, network connections comprising a first connection between a first network node and the user equipment and a second connection between a second network node and the user equipment, the first network node having a first network node type and the second network node having a second network node type different from the first network node type;
detecting, by the user equipment, a link failure of the second connection;
sending, by the user equipment and in response to the link failure, a message to the first network node to instruct the first network node to transfer context information of the user equipment to a third network node, the third network node having the second network node type; and
performing, by the user equipment and in response to the link failure, an establishment procedure for a third connection with the third network node having the context information transferred from the first network node and having the second network node type, while maintaining the first connection between the first network node and the user equipment.

16. The method according to claim 15, wherein the message comprises a notification of the link failure, and the method further comprises:
receiving an indication of the third network node from the first network node, wherein the third network node is selected based at least in part on a measurement report provided by the user equipment.

17. The method according to claim 15, wherein the message comprises an indication of the third network node and the context information of the user equipment comprises at least one of: a security key for the third connection and security information related to the user equipment.

18. An apparatus, comprising:
   at least one processor; and
   at least one memory including computer program code,
   the at least one memory and the computer program code configured to, with the at least one processor, cause the apparatus to at least:
      maintain network connections comprising a first connection between a first network node and the apparatus and a second connection between a second network node and the apparatus, the first network node having a first network node type and the second network node having a second network node type different from the first network node;
      detect a link failure of the second connection;
      send, in response to the link failure, a message to the first network node to instruct the first network node to transfer context information of the apparatus to a third network node, the third network node having the second network node type; and
      perform, in response to the link failure, an establishment procedure for a third connection with the third network node having the context information transferred from the first network node and having the second network node type, while maintaining the first connection between the first network node and the apparatus.

19. The apparatus according to claim 18, wherein the message comprises an indication of the third network node.

20. The apparatus according to claim 18, wherein the message comprises a notification of the link failure, and the apparatus is caused to at least:
   receive an indication of the third network node from the first network node, wherein the third network node is selected based at least in part on a measurement report provided by the apparatus.

21. The apparatus according to claim 18, wherein the context information of the apparatus comprises at least one of: a security key for the third connection and security information related to the apparatus.

22. The apparatus according to claim 18, wherein the first network node is in a first mobile communications network, and the second network node and the third network node are in a second mobile communications network.

* * * * *